June 1, 1965 R. W. KURTZ 3,186,741
CUSHIONED PIPE JOINT
Filed April 1, 1963
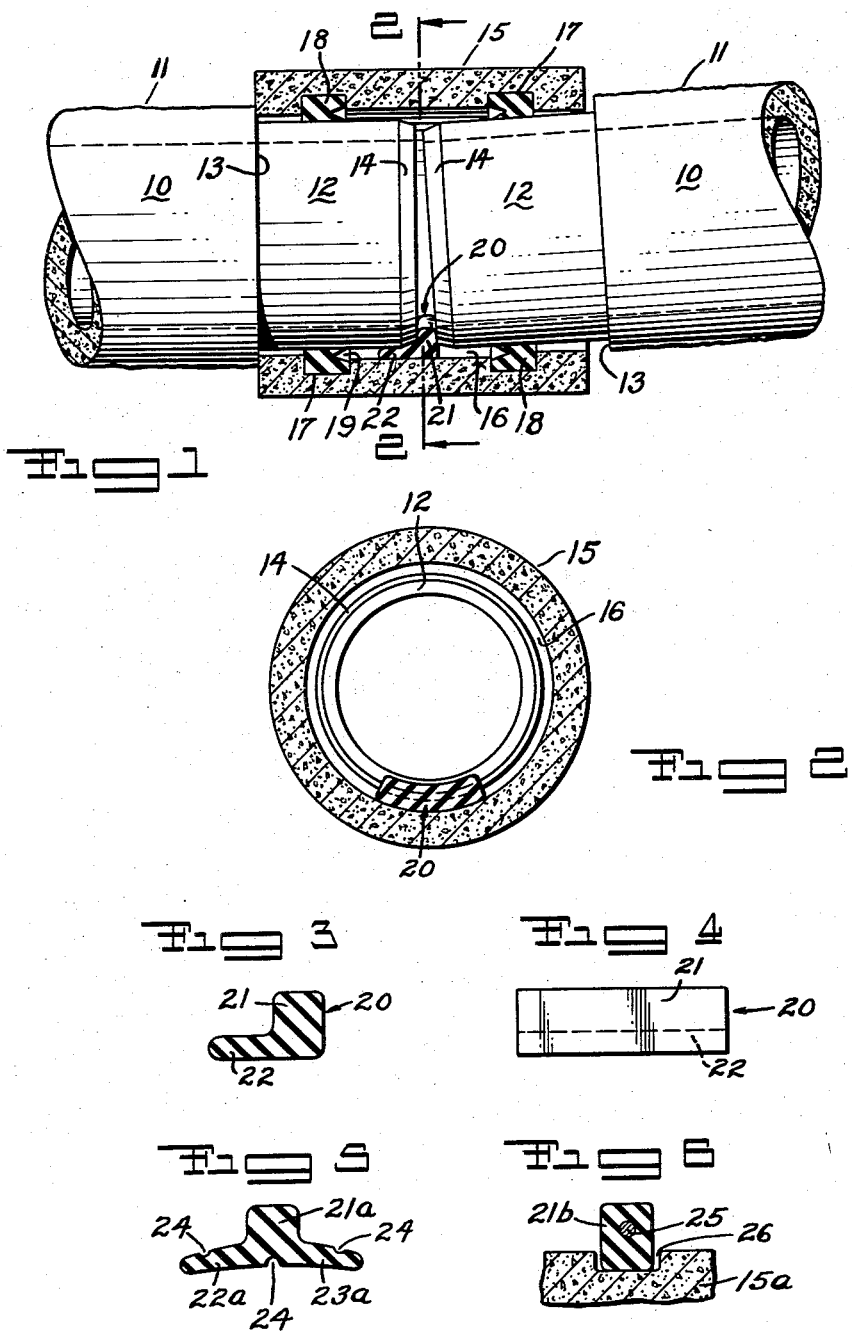

3,186,741
CUSHIONED PIPE JOINT
Ralph W. Kurtz, Coshocton, Ohio, assignor to James B. Clow & Sons, Inc., Chicago, Ill., a corporation of Delaware
Filed Apr. 1, 1963, Ser. No. 269,462
3 Claims. (Cl. 285—111)

This invention relates generally to pipe joints, and more particularly to an improved cushioned joint or coupling for use in connecting pipes that must be installed with their adjoining ends disposed in slightly axially spaced relation, such as asbestos-cement pipes which are subject to limited swelling and lineal elongation when soaked in water, and which might be crushed or fractured if installed with their adjoining ends in direct contact or abutment.

Asbestos-cement pipes are commonly produced in diameters as large as 24 inches and lengths as great as 13 feet. The lineal expansion of such pipes, due to water absorption and thermal change, may be as much as 0.3 inch. Hence, it is advisable to separate the adjoining ends of a pair of these pipes by a distance at least equal to the expected lineal expansion of each pipe section.

The ends of asbestos-cement pipes are usually trued by machining and this operation produces an external shoulder or annular step which can serve as a stop or hilt when the trued end of the pipe is pushed inwardly into a close-fitting sleeve or coupling. The stop or hilt, engaging an end of the sleeve or coupling, serves to arrest further inward movement of the inserted pipe. Also, these pipes are generally machined for a distance equal to about one-half the length of an associated coupling sleeve and, hence, it is possible to determine the hidden gap or spacing between the adjoining ends of a pair of pipes within the coupling sleeve by reference to the sleeve-to-hilt clearances.

In prior art pipe joints of this general type, a sealing ring or gasket is mounted in each end of the coupling sleeve and radially compressed or tightened by the plowing action of the pipes as they are inserted into the sleeve. The end of the pipe is generally tapered and lubricated to facilitate this action, and pushed into the sleeve by one of several well-known means, such as, a hand lever, hydro-jack, or back-hoe device.

The desired gap or "breathing space" between the adjoining ends of the pipes has heretofore been achieved in one of three well-established ways. For example, U.S. Patent No. 2,871,031 discloses a pipe joint in which the pipe hilt is spaced from the coupling sleeve by means of a reusable slip-on clip which is removed from the joint after several more pipes have been added to the line and the danger of disturbance has accordingly passed. U.S. Patent No. 2,738,992 proposes a joint wherein the trued end portion of the pipe is provided with a step or stop which passes into the mouth of the sleeve and engages an associated gasket or sealing ring. U.S. Patent No. 2,914,374 shows a joint wherein an annular gasket is mounted in the middle of the sleeve where it engages the end faces of both pipe sections in a resilient spring-like manner.

All of these prior pipe joints are objectionable from one standpoint or another, either because of the inconvenience of assembly, inherent weakness, or relatively high cost.

It follows, therefore, that the primary object of the present invention is to provide an efficient and more economical means for connecting the adjoining ends of pipes in axially spaced relationship to allow for lineal expansion or elongation of the pipes due to moisture absorption and/or thermal change.

In the accompanying drawing:

FIGURE 1 is a side sectional view taken through a pipe joint formed in accordance with the present invention;

FIGURE 2 is a transverse cross-sectional view taken along the line 2—2 of FIGURE 1;

FIGURE 3 is an enlarged, transverse vertical sectional view of a pipe-spacing, segmental cushion employed in the present pipe joint;

FIGURE 4 is a side elevational view of the cushion shown in FIGURE 3;

FIGURE 5 is a transverse vertical sectional view of a modified form of pipe-spacing cushion; and FIGURE 6 is a similar view of a further modified form of pipe-spacing cushion and an adjacent portion of a suitably adapted coupling sleeve.

With reference to FIGURE 1 of the drawing, it will be seen that the present pipe joint comprises a pair of axially adjoining pipes 10 preferably formed from asbestos-cement. In the usual manner, the main body portions of the pipes 10 possess a rough outer surface, indicated at 11, and each pipe 10 terminates at each end thereof in a machined spigot portion 12 having a smaller outer diameter than the main body portion of the pipe. The reduced diameter spigot portion 12 defines with the main body portion of each pipe an annular step, shoulder, or hilt 13. The outer end of the spigot portion 12 is tapered or beveled, as at 14, to facilitate insertion of the pipe into the joint, as will be hereinafter explained. Surrounding the spigot portions 12 of the pipes is a cylindrical coupling sleeve 15 also preferably formed from asbestos-cement. The coupling sleeve 15 is formed with an axial through passage, chamber or bore 16 which preferably has a slightly larger diameter in the central portion of the sleeve than at the ends thereof. The coupling sleeve 15 is also provided inwardly from each end thereof with a pair of annular, radially enlarged recesses or grooves 17 in each of which is seated a continuous, annular sealing ring or gasket 18 of rubber or other resiliently flexible elastomeric material. The sealing rings or gaskets 18 may be of any standard form or construction, but are preferably of the type having a V-shaped groove 19 formed in one of the side faces thereof to increase the radial flexibility or pliability of the gasket.

It should here be understood that the structural elements of the present joint described in the foregoing paragraph are well known and are common to several different types of pipe joints heretofore proposed and used in the art, and that no claim is made herein to the use of these conventional elements of structure apart from the specific combination set forth in the appended claims.

In accordance with the present invention, I provide a structurally simple and inexpensive, segmental, spacer cushion 20 which is adapted to be positioned within the central portion of the sleeve 15 to serve as a spacing abutment for the ends of the pipes 10. The cushion 20 is preferably formed as an extrusion from rubber, or one of the rubber-like, synthetic elastomers, such as polyurethane, and preferably possesses a hardness within the range of 40 to 70 Durometer A. The material from which the cushion 20 is formed should have a tensile strength of at least 1000 p.s.i. and may incorporate therein a dispersion of reinforcing fibers and/or a water-soluble salt or powder.

As shown in FIGURES 3 and 4, the cushion 20 is of generally linear form in its relaxed or unflexed condition and possesses a generally L-shaped cross section defined by a rectangular body portion 21 and a perpendicularly related, relatively thinner and laterally extended anchoring lip or fin 22. However, in its operative or applied position, as shown in FIGURES 1 and 2, the cushion 20 is resiliently flexed so as to assume a segmental arcuate configuration conforming to the curvature of the inner wall surface of the sleeve 15, with the laterally extending anchoring lip or fin portion 22 inserted between the spigot portion 12 of the left hand (FIG. 1) pipe 10 and the inner wall of the sleeve 15. The main body portion 21 of the cushion is compressed between the adjoining ends or noses of the two pipes 10 to thereby maintain the pipes in the desired axially spaced relationship. The length of the cushion 20 may range from 10 to 40 percent of the cirumference of the central inner wall portion of the sleeve 15 to provide the necessary cushioning area to prevent direct contact between the ends of the pipes 10, even when the pipes 10 are assembled in slightly axially misaligned relationship as indicated in FIGURE 1.

The thickness of the main body portion 21 of the cushion should be at least 0.3 percent of the length of each pipe, in order to provide a space or gap between the ends of the pipes which is slightly greater than the maximum extent of elongation (approximately 0.2 percent) of the pipe due to maximum moisture absorption and thermal change. The height of the main body portion 21 of the cushion 20 is such as to extend from the central inner wall surface of the sleeve to a point between the inner and outer wall surfaces of the spigot portions 12 of the pipes, but is preferably insufficient to project radially into the internal passages or bores of the pipes 10.

The present pipe joint or coupling may be partially assembled at the factory, or may be totally assembled in the field if desired. In either event, the joint is assembled by first seating the sealing rings or gaskets 18 in the annular recesses 17 of the sleeve. Next, the sleeve 15 is telescoped fully over the spigot portion 12 of one of the pipes 10 (the left hand pipe 10 as viewed in FIG. 1) to a point at which the sleeve 15 abuts and rests against the shoulder or hilt 13 of the pipe. In so doing, the spigot portion 12, which is preferably lubricated, plows through the opening in the left hand sealing ring 18 and resiliently compresses the same to form a liquid tight seal between the sleeve and the inserted pipe. The spacer cushion 20 is then installed through the open end of the sleeve 15 by forcibly wedging the anchoring lip or fin 22 between the nose of the inserted pipe and the inner wall of the coupling sleeve.

If desired, the outer surfaces of the cushion 20 may be coated with a suitable adhesive to connect the cushion to the inner wall suface of the sleeve 15 and to the cushion contacting areas of the pipe 10. As will be understood, the foregoing steps in the overall assembly of the completed joint may advantageously be performed at the factory where access to and manipulation of the pipes and coupling sleeve is substantially unrestricted. The assembly of the joint is, of course, completed in the field by forcibly inserting the lubricated spigot portion 12 of the second pipe 10 (right hand pipe 10 as viewed in FIG. 1) through the exposed end of the coupling sleeve 15 and through the adjacent sealing ring 18 to a point at which the nose or end of the second pipe contacts the spacer cushion 20. Should the second pipe be inserted into the sleeve 15 with sufficient force to compress the spacer cushion 20 to any great extent, the inherent resiliency of the cushion will serve to back-off the second pipe slightly when inward pushing action on the lubricated spigot portion of the second pipe is ceased.

As will be noted in FIGURE 1, the present joint construction allows for a limited degree of axial misalignment of the adjoining pipes, such as commonly results from unevenness of the trench bottom in which the pipeline is installed. As previously indicated, the axial thickness of the body portion of the spacer cushion 20 is sufficient not only to permit the desired lineal expansion or elongation of the pipes, but also to prevent contact of the adjoining ends of the pipes under conditions of maximum permissible misalignment thereof.

While a preferred, more economical form of spacer cushion 20 is shown in FIGURES 1 through 4 of the drawings, it will be understood that other forms and constructions of spacer cushion may be employed within the scope of the appended claims. For example, the L-shaped spacer cushion 20 may be replaced by one having a generally inverter T-shaped cross section as shown in FIGURE 5. The modified spacer cushion shown in FIGURE 5 comprises a generally rectangular main body portion 21a formed with laterally extending longitudinally coextensive anchoring lips or fins 22a and 23a projecting outwardly on both sides thereof. The relatively wider base provided by the oppositely extended anchoring fins 22a and 23a facilitates the cementing of the spacer cushion to the iner wall of the coupling sleeve 15, and, if desired, the sleeve and spigot-contacting surfaces of the fins 22a and 23a may be formed with grooves or channels 24 to increase the flexibility of the cushion and to provide adhesive-retaining crevices.

FIGURE 6 illustrates another modified form of resilient spacer cushion comprising an elongated block-like body 21b of rectangular cross section formed with a longitudinally extending bore in which is carried a wire 25 of relatively soft, ductile metal, such as copper. This spacer cushion 21b is particularly useful in relatively small diameter pipe joints requiring the cushion to be bent in an arc having a comparatively small radius of curvature. The non-resilient, ductile wire 25 enables the cushion to be bent into and to retain a desired high degree of arcuate curvature independent of an anchoring lip or fin. However, it is desirable that the cushion 21b be mounted and retained in a radial recess or groove 26 formed in the inner wall of the associated coupling sleeve 15a, in order to properly locate the cushion centrally between the relatively adjoining pipes.

While the spacer cushion has been shown as located in the bottom or lower portion of the coupling sleeve, it will be understood that the cushion can be located at substantially any circumferentially adjusted position around the central portion of the coupling sleeve if the deflection or axial misalignment of the pipes make such location advantageous. However, the bottom location is ordinarily the best, in view of the fact that it is usually possible and convenient to push the pipe into the coupling sleeve at a slightly downward angle, as indicated in FIGURE 1. Also, while a single spacer cushion is ordinarily sufficient, it will be obvious that more than one cushion may be employed when considered necessary or desirable.

While certain preferred embodiments of the present invention have been illustrated and described in detail, it will be understood that various other modifications may be resorted to without departing from the spirit of the invention or the scope of the following claims.

I claim:

1. In a pipe coupling which includes a pair of cylindrical pipes normally subject to lineal expansion and having end portions disposed in substantially longitudinally adjoining relation, an annular coupling sleeve disposed around the relatively adjoining end portions of said pipes, and a pair of resiliently flexible, annular gaskets carried in said sleeve and disposed respectively in fluid tight engagement with the relatively adjoining end portions of said pipes; that improvement which comprises a resiliently flexible spacer cushion positioned in said sleeve and having a main body portion pinched between arcuate segments of the ends of said pipes, said spacer cushion possessing an initially straight lineal form in an unflexed condition, but being resiliently flexed in its applied position into segmental arcuate configuration conforming to the curvature of a segment of the inner circumference of said sleeve, the main body portion of said cushion having a length dimension of from 10% to 40% of the inner circumference of said sleeve and a thickness dimension greater than the normal lineal expansion of either of said pipes.

2. A pipe coupling as defined in claim 1, wherein said spacer cushion includes a laterally projecting, longitudinally coextensive anchoring fin positioned between the inner surface of said sleeve and the outer circumferential surface of at least one of said pipes.

3. A pipe coupling as defined in claim 1, wherein said spacer cushion is composed of an elastomer having a hardness of from 40 to 70 Durometer A.

References Cited by the Examiner

UNITED STATES PATENTS

| | | | |
|---|---|---|---|
| 865,498 | 9/07 | Kenyon | 285—383 |
| 2,294,142 | 8/42 | Turner | 285—383 |
| 2,374,138 | 4/45 | Sanford | 285—383 |
| 2,805,872 | 9/57 | Routh | 285—369 |
| 2,835,723 | 5/58 | Killian | 285—369 |
| 2,871,031 | 1/59 | Altemus | 285—369 |
| 3,066,961 | 12/62 | Gerin | 285—230 |
| 3,129,964 | 4/64 | McNeil | 285—369 |

FOREIGN PATENTS

| | | |
|---|---|---|
| 525,153 | 8/40 | Great Britain. |
| 542,716 | 5/56 | Italy. |

CARL W. TOMLIN, *Primary Examiner.*

THOMAS F. CALLAGHAN, *Examiner.*